US007181341B2

(12) United States Patent
Kadowaki

(10) Patent No.: US 7,181,341 B2
(45) Date of Patent: Feb. 20, 2007

(54) ATMOSPHERIC PRESSURE SENSING APPARATUS

(75) Inventor: Hisashi Kadowaki, Chita-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/338,730

(22) Filed: Jan. 25, 2006

(65) Prior Publication Data

US 2006/0178805 A1 Aug. 10, 2006

(30) Foreign Application Priority Data

Feb. 9, 2005 (JP) ............................ 2005-032624

(51) Int. Cl.
*F02D 45/00* (2006.01)
*G06F 17/00* (2006.01)

(52) U.S. Cl. ..................................... 701/115; 73/118.1

(58) Field of Classification Search ................ 701/115, 701/102, 29, 33, 35; 73/115, 116, 117.3, 73/118.1
See application file for complete search history.

(56) References Cited

U.S. PATENT DOCUMENTS 4,938,195 A * 7/1990 Miyazaki et al. ............. 73/115
5,035,226 A * 7/1991 Nishikawa et al. ........ 73/117.3
6,584,960 B2 * 7/2003 Kishibata et al. ........... 123/478

FOREIGN PATENT DOCUMENTS

JP 6-201496 7/1994

* cited by examiner

*Primary Examiner*—Hieu T. Vo
(74) *Attorney, Agent, or Firm*—Nixon & Vanderhyep P.C.

(57) ABSTRACT

An ECU computes a guard value K and limits an amount of change in a measured atmospheric pressure value of an atmospheric pressure sensor per unit time through use of the computed guard value. The guard value is a value that corresponds to an amount of change in the atmospheric pressure per unit time caused by a change in an altitude.

8 Claims, 5 Drawing Sheets

ATMOSPHERIC PRESSURE SENSING APPARATUS

CROSS REFERENCE TO RELATED APPLICATION

This application is based on and incorporates herein by reference Japanese Patent Application No. 2005-32624 filed on Feb. 9, 2005.

BACKGROUND OF THE INVENTION

1. Field of the Invention

The present invention relates to an atmospheric pressure sensing apparatus, which includes an atmospheric pressure sensor arranged in a case, which receives a control circuit for controlling an internal combustion engine of a vehicle.

2. Description of Related Art

For instance, when a vehicle is traveling along a road climbing a mountain, the atmospheric pressure will change due to a change in an altitude to cause a change in a density (a mass flow rate) of intake air of an internal combustion engine of the vehicle. To counteract this, it has been proposed to correct an air-fuel ratio control parameter, such as a total fuel injection quantity of the internal combustion engine, in accordance with a measured atmospheric pressure value that is measured with an atmospheric pressure sensor to improve an air-fuel ratio control accuracy.

In such a system, which has the atmospheric pressure sensor, the atmospheric pressure sensor is often installed on a circuit board of a control circuit (hereinafter, referred to as an ECU), so that the atmospheric pressure sensor and the ECU are received in a case of the ECU, which is placed in an engine room of vehicle. In this instance, as shown in FIG. 8, when water is applied to the case of the ECU at the time of, for example, washing the vehicle or driving the vehicle on a submerged road, the air, which is present in the case, is rapidly cooled to cause a temporal and rapid drop of the pressure inside the case. Therefore, a measured value of the atmospheric pressure, which is measured with the atmospheric pressure sensor arranged in the case, tends to be temporarily reduced from the actual atmospheric pressure. As a result, at the time of application of water to the case, the atmospheric pressure measurement accuracy of the atmospheric pressure sensor tends to be deteriorated.

To counteract with this, a breathing hole may be formed through a wall of the case of the ECU to communicate between the surrounding atmosphere and an interior of the case and thereby to limit the pressure drop inside the case. Alternatively, the case of the ECU may be placed to a location where there is less chance of getting water.

Furthermore, for example, Japanese Unexamined Patent Publication No. H06-201496 teaches a system, which determines that the atmospheric pressure sensor is abnormal when a rate of change in the measured atmospheric pressure value of the atmospheric pressure sensor becomes equal to or greater than an abnormality determination threshold value.

However, the above measures pose the following disadvantages. That is, in the case of forming the breathing hole in the case of the ECU, a relatively large breathing hole needs to be provided to effectively limit the pressure drop inside the case at the time of application of water to the case, and water could possibly enter the case through such a large breathing hole. To counteract this, a waterproof filter or the like needs to be installed to the breathing hole. In such a case, the air permeability of the breathing hole is disadvantageously reduced by the waterproof filter, and therefore the pressure drop at the time of application of water to the case cannot be sufficiently limited, causing a deterioration of the atmospheric pressure measurement accuracy of the atmospheric pressure sensor.

Furthermore, when the case of the ECU is arranged outside of a passenger compartment (e.g., arranged in the engine room), it is sometimes difficult to provide a space for accommodating the case at a location where water is not applied. Thus, in such a situation, it is not possible to sufficiently limit the pressure drop inside the case at the time of application of water to the case. As a result, the deterioration of the atmospheric pressure measurement of the atmospheric pressure sensor cannot be sufficiently limited.

Furthermore, in the system of Japanese Unexamined Patent Publication No. H06-201496, which determines that the atmospheric pressure sensor is abnormal when the rate of change in the measured atmospheric pressure value of the atmospheric pressure sensor becomes equal to or greater than the abnormality determination threshold value, the normal atmospheric pressure sensor could be erroneously determined as the abnormal atmospheric pressure sensor when the measured atmospheric pressure value of the atmospheric pressure sensor temporarily and rapidly drops at the time of application of water to the case.

The present invention is made in view of the above disadvantages, and therefore it is an objective of the present invention to provide an atmospheric pressure sensing apparatus that addresses at least one of the above disadvantages.

To achieve the objective of the present invention, there is provided an atmospheric pressure sensing apparatus for a vehicle. The atmospheric pressure sensing apparatus includes a case, an atmospheric pressure sensor and a measured atmospheric pressure value limiting means. The case receives a control circuit of an internal combustion engine of the vehicle. The atmospheric pressure sensor measures an atmospheric pressure and is received in the case. The measured atmospheric pressure value limiting means is for limiting a rapid change in a measured atmospheric pressure value, which is measured with the atmospheric pressure sensor.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION (First Embodiment)

A first embodiment of the present invention will be described with reference to FIGS. 1 to 4.

Figure 1:
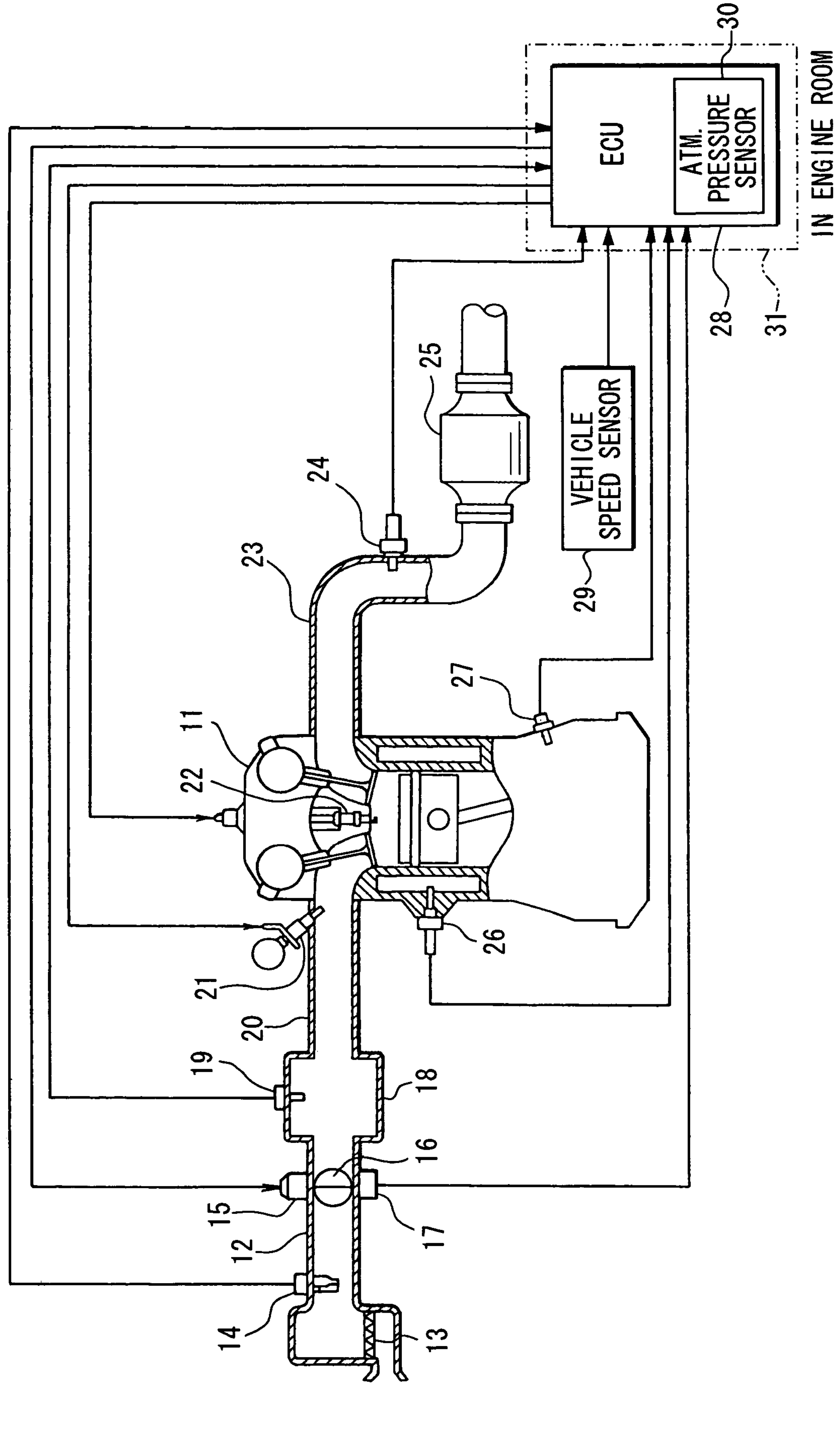
FIG. 1 is a schematic diagram schematically showing an entire structure of an engine control system according to a first embodiment of the present invention.

An entire structure of an engine control system will be described with reference to FIG. 1. An air cleaner 13 is arranged in an upstream end part of an intake air pipe 12 of an internal combustion engine (hereinafter, simply referred to as an engine) 11, and an airflow meter 14 is arranged on a downstream side of the air cleaner 13 to measure an intake air quantity (an intake airflow rate). A throttle valve 16 and a throttle opening degree sensor 17 are arranged on a downstream side of the airflow meter 14. An opening degree of the throttle valve 16 is adjusted by a motor 15, and the throttle opening degree sensor 17 senses the opening degree of the throttle valve 16.

Furthermore, a surge tank 18 is arranged on a downstream side of the throttle valve 16, and an air intake pipe pressure sensor 19 is provided to the surge tank 18 to measure an intake air pipe pressure. Furthermore, an intake manifold 20 is connected to the surge tank 18 to supply air into each cylinder of the engine 11, and a fuel injection valve 21 is provided to each cylinder of the engine 11 around a corresponding air intake port of the intake manifold 20 to inject fuel into the cylinder. Spark plugs 22 are installed to a cylinder head of the engine 11 in such a manner that each spark plug 22 is provided to a corresponding one of the cylinders to ignite an air-fuel mixture in the cylinder with a spark produced from the spark plug 22.

An exhaust gas sensor 24 (e.g., an air-fuel ratio sensor, an oxygen sensor) is provided in an exhaust pipe 23 of the engine 11 to sense an air-fuel ratio or a rich/lean state of the exhaust gas. A catalytic converter 25, such as a three-way catalytic converter, is provided on a downstream side of the exhaust gas sensor 24 to remove noxious components from the exhaust gas.

Furthermore, a coolant temperature sensor 26 and a crank angle sensor 27 are also provided to the cylinder block of the engine 11. The coolant temperature sensor 26 senses a temperature of engine coolant. The crank angle sensor 27 outputs a pulse signal per predetermined crank angle of a crankshaft of the engine 11 upon rotation of the crankshaft. A crank angle and an engine rotational speed are determined based on the output signals of the crank angle sensor 27. Furthermore, a vehicle speed is measured with a vehicle speed sensor 29, and an atmospheric pressure is measured with an atmospheric pressure sensor 30.

The outputs of the above sensors are supplied to an engine control circuit (hereinafter, simply referred to as an ECU) 28. The ECU 28 includes a microcomputer as its main component. The ECU 28 executes various engine control programs, which are stored in a ROM (storage medium) of the ECU 28, to control, for example, a fuel injection quantity of each fuel injection valve 21 and ignition timing of each spark plug 22 based on the engine operational state.

Figure 8:
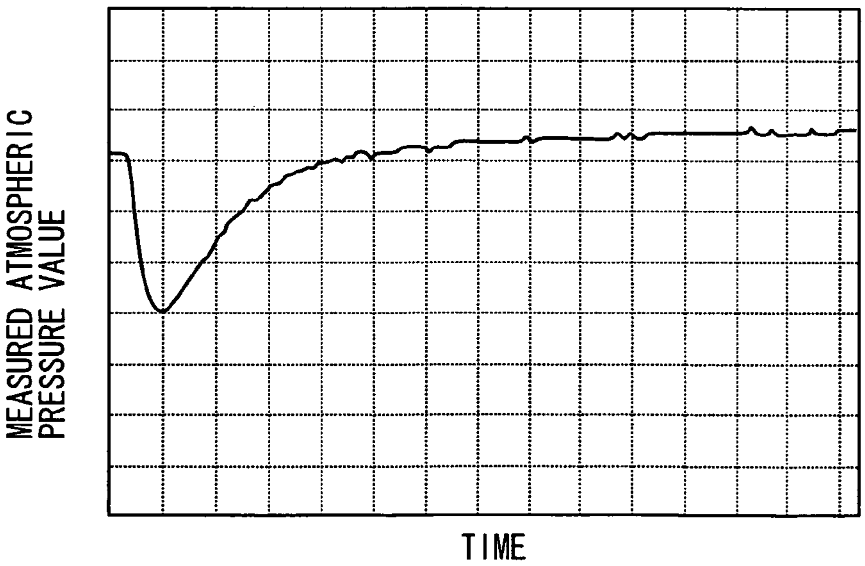
FIG. 8 RELATED ART
FIG. 8 is a time chart showing behavior of a measured atmospheric pressure value at the time of application of water to a case of an ECU according to a previously proposed technique.

The atmospheric pressure sensor 30 is installed on a circuit board of the ECU 28, and the ECU 28 and the atmospheric pressure sensor 30 are received in a case 31 of the ECU 28 and are arranged in an engine room. Thus, as shown in FIG. 8, when water is applied to the case 31 of the ECU 28 at the time of, for example, washing the vehicle or driving the vehicle on a submerged road, the air, which is present in the case 31, would be rapidly cooled to cause a temporal and rapid drop of the pressure inside the case 31, and therefore a measured value of the atmospheric pressure (or simply referred to as a measured atmospheric pressure value), which is measured with the atmospheric pressure sensor 30 arranged inside the case 31, tends to be temporarily reduced from the actual atmospheric pressure.

Figure 2:
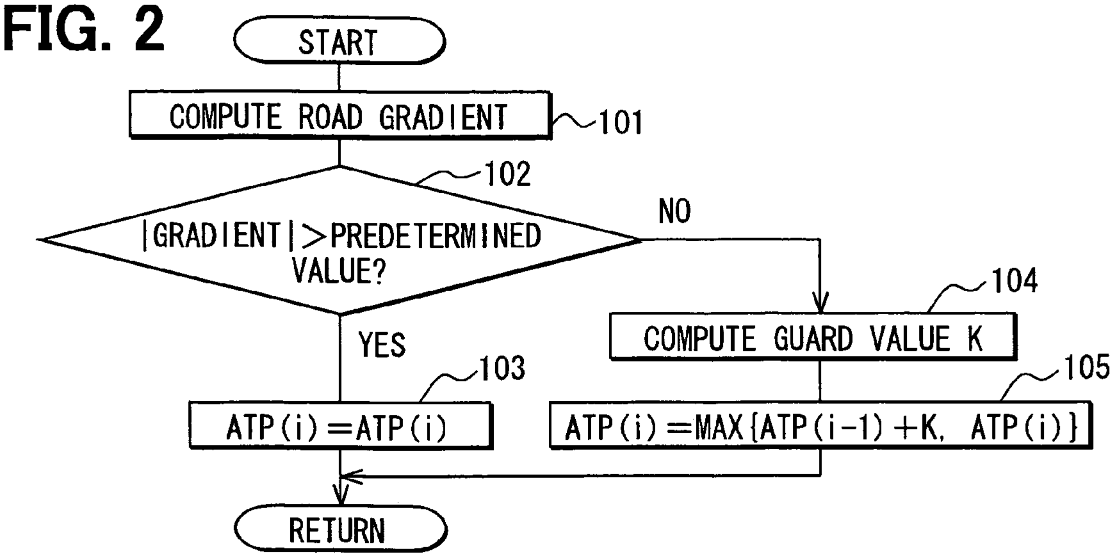
FIG. 2 is a flowchart showing an operational process of a measured atmospheric pressure value limiting program of the first embodiment.

In view of the above disadvantage, the ECU 28 executes a measured atmospheric pressure value limiting program shown in FIG. 2 to compute a guard value K and limits an amount of change in the measured atmospheric pressure value ATP of the atmospheric pressure sensor 30 per unit time (per computation period) through use of the computed guard value K. The guard value K is a value that corresponds to an amount of change in the atmospheric pressure per unit time caused by a change in an altitude and is obtained as follows. That is, a road gradient of the road, along which the subject vehicle travels, is computed first based on an engine rotational speed, an engine load and a gearshift position of a transmission. Then, based on the road gradient and the vehicle speed, the guard value K is computed. Through use of the guard value K, even when the pressure inside the case 31 temporarily and rapidly drops due to the application of water to the case 31, the measured atmospheric pressure value ATP of the atmospheric pressure sensor 30 arranged inside the case 31 is limited within an appropriate range, which corresponds to the change in the atmospheric pressure caused by the change in the altitude. As a result, the behavior of the measured atmospheric pressure value ATP of the atmospheric pressure sensor 30 is approximated to the behavior of the actual atmospheric pressure.

Now, the measured atmospheric pressure value limiting program of FIG. 2, which is executed by the ECU 28, will be described in detail. The measured atmospheric pressure value limiting program of FIG. 2 is periodically repeated at predetermined intervals while power supply to the ECU 28 is maintained. The measured atmospheric pressure value limiting program serves as a measured atmospheric pressure value limiting means of the present invention. When the measured atmospheric pressure value limiting program is started, the road gradient, which corresponds to the current engine rotational speed (or the current vehicle speed), the current engine load and the current gearshift position of the transmission, is estimated, i.e., is computed at step 101 with reference to road gradient maps shown in FIG. 3.

Figure 3:
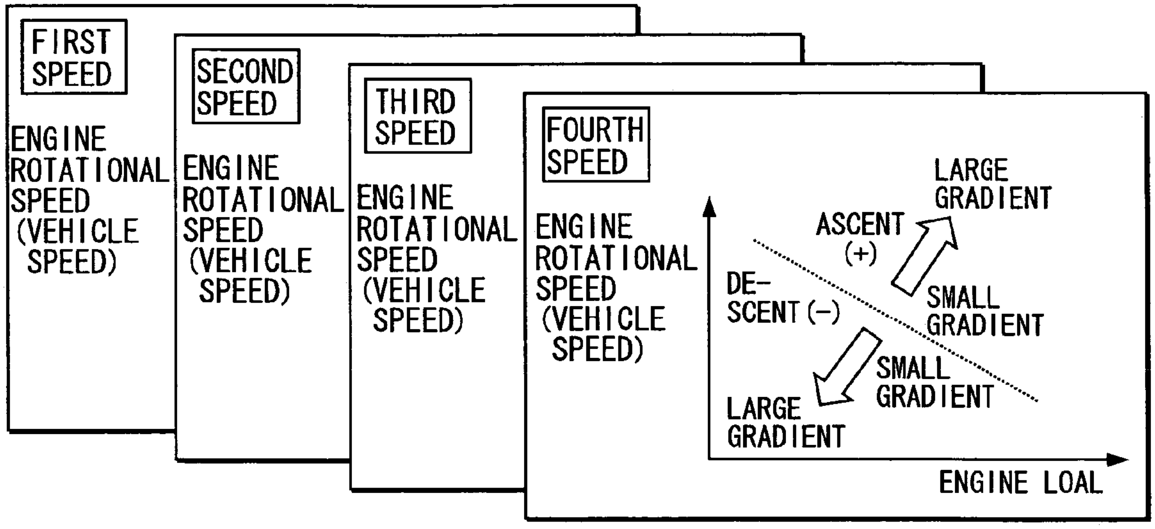
FIG. 3 is a schematic diagram showing an example of road gradient maps.

The road gradient maps of FIG. 3 are produced in advance for the gearshift positions (e.g., a first speed position, a second speed position, a third speed position and a fourth speed position), respectively, of the transmission based on, for example, experimental data and design data. In each road gradient map, the engine rotational speed (or the vehicle speed) and the engine load are used as parameters. These maps are set as follows. That is, when the road gradient is an ascent (upward slope), the road gradient becomes a positive (+) value. In contrast, when the road gradient is a descent (downward slope), the road gradient becomes a negative (−) value. Furthermore, when the road gradient becomes a steeper gradient (either a steeper ascent or a steeper descent), an absolute value of the road gradient is increased. The above process of step 101 serves as a road gradient estimating means of the present invention.

After computation of the road gradient, control proceeds to step 102. At step 102, it is determined whether an absolute value of the computed road gradient is larger than a predetermined value to determine whether the computed road gradient is a steep gradient (a steep ascent or a steep descent) that is greater than a predetermined gradient, i.e., to determine whether the computed road gradient is greater than the predetermined gradient. When it is determined that the computed road gradient is the steep gradient, which is greater than the predetermined gradient, at step 102, a change in the atmospheric pressure caused by a change in the altitude should be relatively large, so that it is determined that the measured atmospheric pressure value ATP of the atmospheric pressure sensor 30 should not be limited. Thus, control proceeds to step 103 where the current measured atmospheric pressure value ATP(i) of the atmospheric pressure sensor 30 is used as a conclusive measured atmospheric pressure value (i.e., a finally determined measured atmospheric pressure value) ATP(i).

$$ATP(i)=ATP(i)$$

In contrast, when it is determined that the computed road gradient is not the steep gradient, which is greater than the predetermined gradient, at step 102, a change in the atmospheric pressure caused by a change in the altitude should be relatively small, so that it is determined that the measured atmospheric pressure value ATP should be limited, i.e., a limitation should be imposed on the measured atmospheric pressure value ATP. Thus, control proceeds to step 104 where the guard value K (the value that corresponds to the amount of change in the atmospheric pressure per unit time caused by the change in the altitude) is computed to limit the change in the measured atmospheric pressure value ATP per unit time (per computation period).

Figure 4:
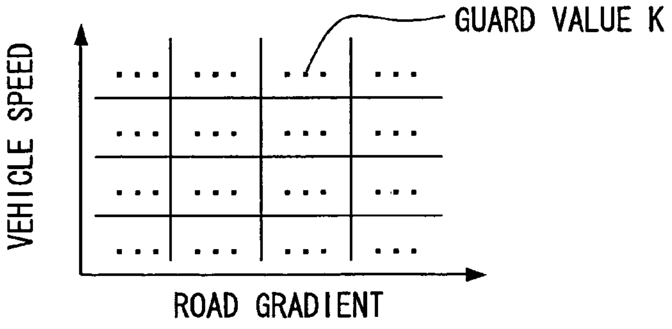
FIG. 4 is a schematic diagram showing an example of a map of a guard value.

In this case, the guard value K, which corresponds to the current road gradient and the current vehicle speed, is computed with reference to a map of the guard value K shown in FIG. 4. The map of the guard value K shown in FIG. 4 is produced in advance based on, for example, experimental data and design data. Furthermore, the map of the guard value K is set such that the guard value K changes in consistent with a shift of an amount of change in the atmospheric pressure per unit time according the road gradient and the vehicle speed. Furthermore, in the case where the road gradient is the ascent, the amount of change in the atmospheric pressure should become a negative value, so that the guard value K is set to be a negative value. In contrast, in the case where the road gradient is the descent, the amount of change in the atmospheric pressure should become a positive value, so that the guard value K is set to be a positive value.

Thereafter, control proceeds to step 105 where a sum [ATP(i−1)+K] of the previous measured atmospheric pressure value ATP(i−1) and the guard value K is compared with the current measured atmospheric pressure value ATP(i) of the atmospheric pressure sensor 30, and the larger one of these two values is used as the current conclusive measured atmospheric pressure value ATP(i).

In this way, when the current measured atmospheric pressure value ATP(i) of the atmospheric pressure sensor 30 becomes lower than the sum [ATP(i−1)+K] of the previous measured atmospheric pressure value ATP(i−1) and the guard value K due to the drop of the pressure inside the case 31 caused by the application of water to the case 31, i.e., when the amount of change in the measured atmospheric pressure value ATP per unit time exceeds the guard value K, the amount of change in the measured atmospheric pressure value ATP per unit time is limited by the guard value K. Thus, the sum [ATP(i−1)+K] of the previous measured atmospheric pressure value ATP(i−1) and the guard value K is used as the current conclusive measured atmospheric pressure value ATP(i).

In the above-described first embodiment, the amount of change in the measured atmospheric pressure value ATP per unit time is limited by the guard value K (the value that corresponds to the amount of change in the atmospheric pressure per unit time caused by the change in the altitude). Thus, even when the pressure inside the case 31 rapidly and temporarily drops due to the application of the water to the case 31, the measured atmospheric pressure value ATP of the atmospheric pressure sensor 30 arranged inside the case 31 can be limited within the appropriate range, which corresponds to the change in the atmospheric pressure caused by the change in the altitude. Therefore, it is possible to approximate the behavior of the measured atmospheric pressure value ATP of the atmospheric pressure sensor 30 to the behavior of the actual atmospheric pressure and thereby to limit the deterioration in the atmospheric pressure measurement accuracy of the atmospheric pressure sensor 30 and/or the deterioration of the abnormality diagnosis accuracy of the atmospheric pressure sensor 30 caused by the pressure drop in the case 31 at the time of application of water to the case 31.

Furthermore, in the first embodiment, the road gradient of the road, along which the subject vehicle travels, is estimated, and the guard value K, which limits the amount of change in the measured atmospheric pressure value ATP per unit time according to the estimated road gradient and the vehicle speed, is computed. Thus, the guard value K, which limits the amount of change in the measured atmospheric pressure value ATP per unit time, can be changed in consistent with the shift of the amount of change in the atmospheric pressure per unit time according the road gradient and the vehicle speed. As a result, the guard value K of the measured atmospheric pressure value ATP can be appropriately set without being substantially influenced by the road gradient and the vehicle speed.

Furthermore, in the first embodiment, the road gradient is estimated based on the engine rotational speed (or the vehicle speed), the engine load and the gearshift position of the transmission because of the fact that the relationship of the engine rotational speed (or the vehicle speed), the engine load and the gearshift position of the transmission changes according to the road gradient. Thus, the road gradient can be estimated with a relatively high precision.

(Second Embodiment)

Figure 5:
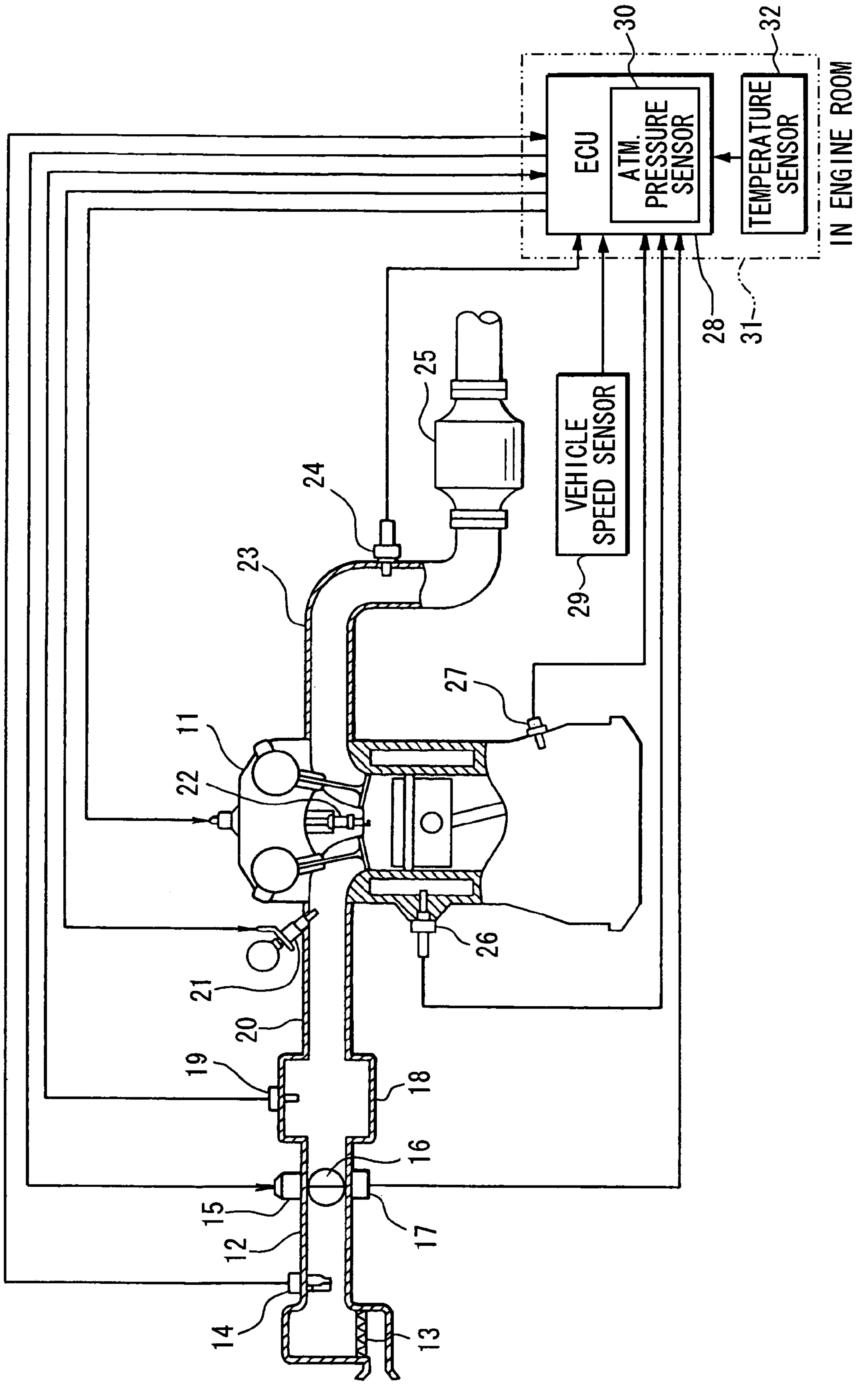
FIG. 5 is a schematic diagram schematically showing an entire structure of an engine control system according to a second embodiment of the present invention.
Figure 6:
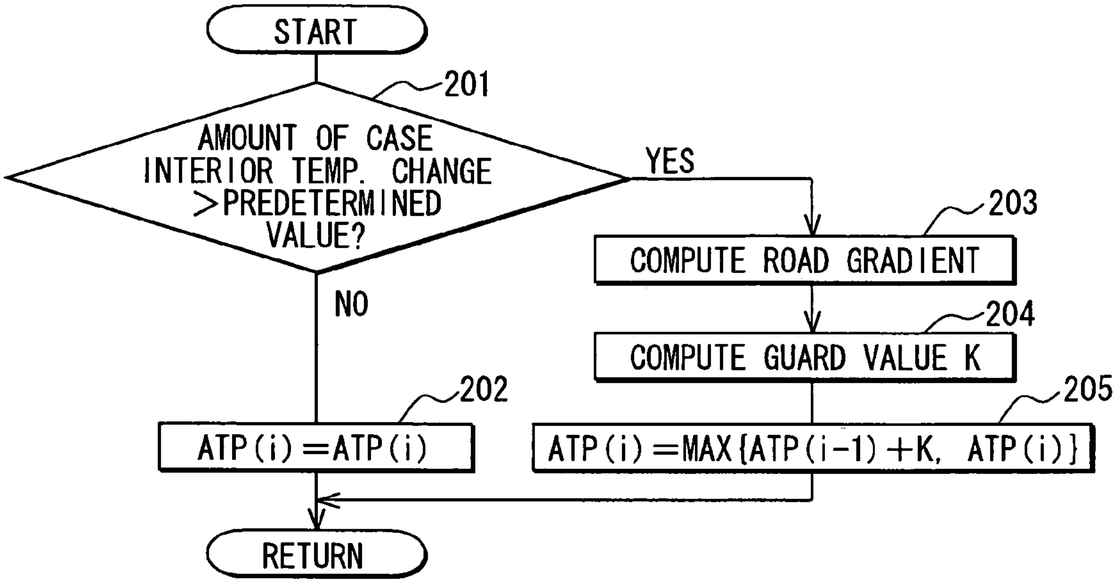
FIG. 6 is a flowchart showing an operational process of a measured atmospheric pressure value limiting program of the second embodiment.

Next, a second embodiment of the present invention will be described with reference to FIGS. 5 and 6.

In the second embodiment, a temperature sensor 32 is arranged in the case 31 of the ECU 28 to measure the temperature inside the case 31. Furthermore, a measured atmospheric pressure value limiting program shown in FIG. 6 is executed. According to this program, when a change in the temperature inside the case 31 is large (e.g., at the time of rapid cooling of the air inside the case 31 due to the application of water to the case 31), it is determined that the measured atmospheric pressure value of the atmospheric pressure sensor 30 arranged inside the case 31 should change in a greater degree than that of the actual atmospheric pressure. Thus, the measured atmospheric pressure value of the atmospheric pressure sensor 30 is limited. In contrast, when a change in the temperature inside the case 31 is small, it is determined that the measured atmospheric pressure value of the atmospheric pressure sensor 30 is generally equal to the actual atmospheric pressure. Thus, the limitation on the measured atmospheric pressure value of the atmospheric pressure sensor 30 is not applied (or is removed).

Now, the measured atmospheric pressure value limiting program of FIG. 6 will be described in detail. When the program is started, it is determined whether an amount of change in the temperature inside the case 31, i.e., an amount of case interior temperature change (a difference between a previous measured value of the temperature inside the case 31 and a current measured value of the temperature inside the case 31) is greater than a predetermined value at step 201. When it is determined that the amount of change in the temperature inside the case 31 is equal to or less than the predetermined value at step 201, the measured atmospheric pressure value ATP of the atmospheric pressure sensor 30 should be generally equal to the actual atmospheric pressure. Thus, it is determined that the limitation on the measured atmospheric pressure value ATP of the atmospheric pressure sensor 30 should not be applied (or should be removed), and control proceeds to step 202. At step 202, the current measured atmospheric pressure value ATP(i) of the atmospheric pressure sensor 30 is directly used as the current conclusive measured atmospheric pressure value ATP(i).

$$ATP(i)=ATP(i)$$

In contrast, when it is determined that the amount of change in the temperature inside the case 31 is greater than the predetermined value at step 201, the measured atmospheric pressure value ATP of the atmospheric pressure sensor 30 should change in a greater degree than that of the actual atmospheric pressure. Thus, it is determined that the measured atmospheric pressure value ATP of the atmospheric pressure sensor 30 should be limited, and control proceeds to step 203. At step 203, the road gradient, which corresponds to the current engine rotational speed (or the current vehicle speed), the current engine load and the current gearshift position of the transmission, is computed with reference to the road gradient maps of FIG. 3. Thereafter, control proceeds to step 204 where the guard value K, which corresponds to the current road gradient and the current vehicle speed, is computed with reference to the map of the guard value K shown in FIG. 4.

Thereafter, control proceeds to step 205 where a sum [ATP(i−1)+K] of the previous measured atmospheric pressure value ATP(i−1) and the guard value K is compared with the current measured atmospheric pressure value ATP(i) of the atmospheric pressure sensor 30, and the larger one of these two values is used as the current conclusive measured atmospheric pressure value ATP(i).

According to the above-described second embodiment, when the change in the temperature inside the case 31 is large (e.g., at the time of rapid cooling of the air inside the case 31 due to the application of water to the case 31), it is determined that the measured atmospheric pressure value ATP of the atmospheric pressure sensor 30 arranged inside the case 31 should change in the greater degree than that of the actual atmospheric pressure. Thus, the measured atmospheric pressure value of the atmospheric pressure sensor 30 is limited. In contrast, when the change in the temperature inside the case 31 is small, it is determined that the measured atmospheric pressure value ATP of the atmospheric pressure sensor 30 is generally equal to the actual atmospheric pressure. Thus, the limitation on the measured atmospheric pressure value of the atmospheric pressure sensor 30 is not applied (or is removed). As a result, the excessive limitation of the measured atmospheric pressure value ATP can be avoided.

In each of the first and second embodiments, the amount of change in the measured atmospheric pressure value ATP per unit time is limited by the guard value K. However, the present invention is not limited to this. For example, the measured atmospheric pressure value ATP may be limited by a corresponding guard value to limit the measured atmospheric pressure value ATP within an appropriate range, which corresponds to a change in the actual atmospheric pressure.

Figure 7:
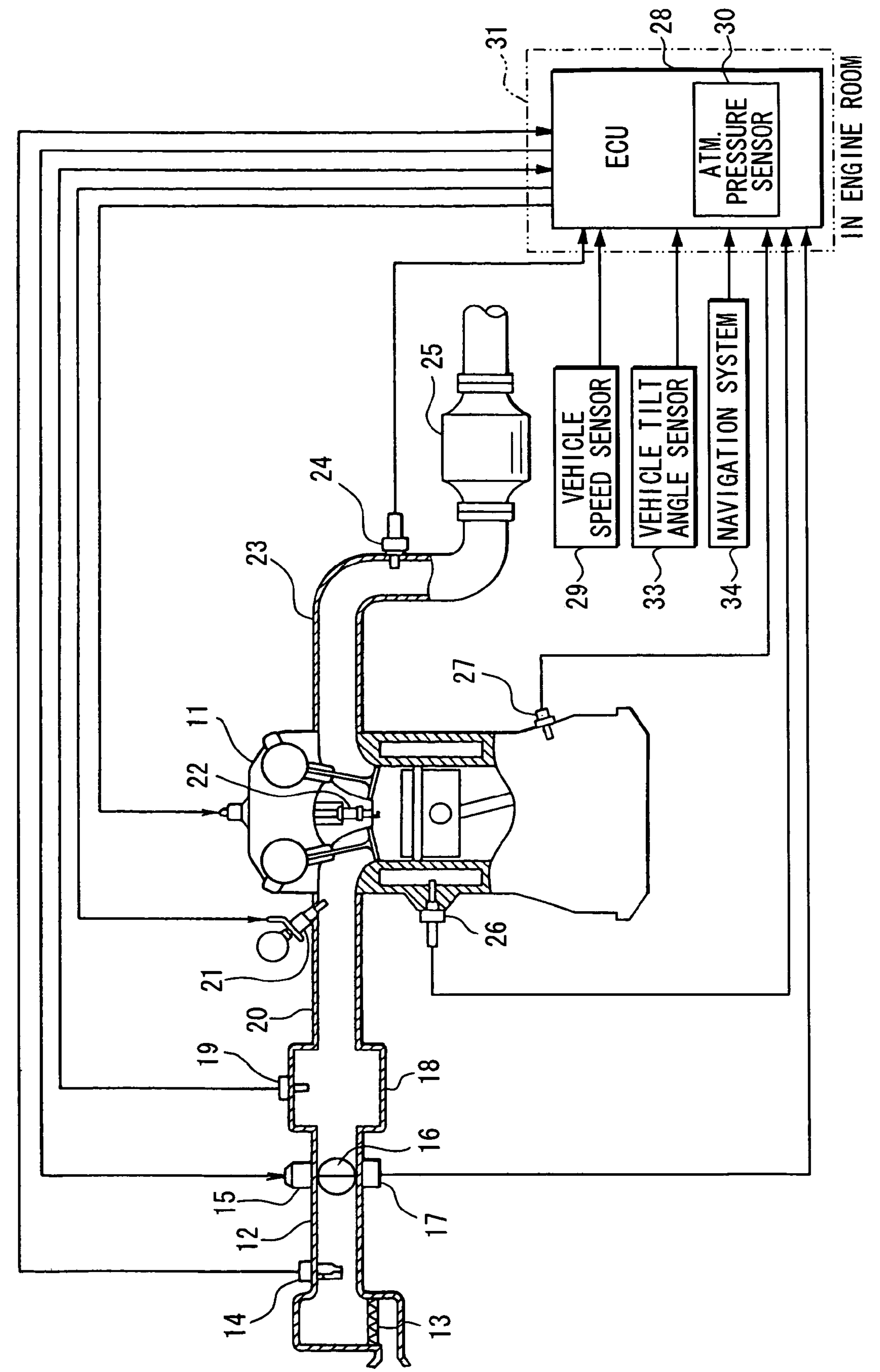
FIG. 7 is a schematic diagram similar to FIG. 1 showing a modification of the first embodiment.

Furthermore, in each of the first and second embodiments, the road gradient is estimated based on the engine rotational speed (or the vehicle speed), the engine load and the gearshift position of the transmission. However, the present invention is not limited to this. For example, the road gradient may be estimated based on a vehicle tilt angle, which is obtained through a vehicle tilt angle sensor (a vehicle tilt angle sensing means for sensing a tilt angle of the vehicle) 33 shown in FIG. 7. Alternatively, the road gradient may be estimated based on road information, which is obtained through a vehicle navigation system 34 shown in FIG. 7. In such a case, the navigation system may be a navigation system, which is installed in the vehicle, or may be a navigation system, which is installed in a handheld device (e.g., a cellular phone, a PDA, a handheld computer) and which provides its signal to the ECU of the vehicle to provide the road information. Furthermore, both of the vehicle tilt angle sensor 33 and the navigation system 34 may be provided together, as shown in FIG. 7. In such a case, if a malfunction occurs in one of the vehicle tilt angle sensor 33 and the navigation system 34, the other one can still provide an appropriate road gradient to implement fail-safe measures. Also, at least one of the vehicle tilt angle sensor 33 and the navigation system 34 may be additionally provided in the first embodiment to implement fail-safe measures. Furthermore, the temperature sensor 32 of the second embodiment may be additionally provided to at least one of the above modifications of the first embodiment in a manner similar to that of the second embodiment.

Additional advantages and modifications will readily occur to those skilled in the art. The invention in its broader terms is therefore not limited to the specific details, representative apparatus, and illustrative examples shown and described.

What is claimed is:

1. An atmospheric pressure sensing apparatus for a vehicle comprising:
- a case that receives a control circuit of an internal combustion engine of the vehicle;
- an atmospheric pressure sensor that measures an atmospheric pressure and is received in the case; and
- a measured atmospheric pressure value limiting means for limiting a rapid change in a measured atmospheric pressure value, which is measured with the atmospheric pressure sensor.

2. The atmospheric pressure sensing apparatus according to claim 1, wherein the measured atmospheric pressure value limiting means limits an amount of change in the measured atmospheric pressure value per unit time.

3. The atmospheric pressure sensing apparatus according to claim 2, further comprising a road gradient estimating means for estimating a road gradient of a road, along which the vehicle travels, wherein the measured atmospheric pressure value limiting means changes a guard value, which limits the amount of change in the measured atmospheric pressure value per unit time according to the estimated road gradient and a vehicle speed.

4. The atmospheric pressure sensing apparatus according to claim 3, wherein the road gradient estimating means estimates the road gradient based on a rotational speed of the internal combustion engine, a load of the internal combustion engine and a gearshift position of a transmission of the vehicle.

5. The atmospheric pressure sensing apparatus according to claim 3, further comprising a vehicle tilt angle sensing means for sensing a tilt angle of the vehicle, wherein the road gradient estimating means estimates the road gradient based on the sensed tilt angle of the vehicle.

6. The atmospheric pressure sensing apparatus according to claim 3, wherein the road gradient estimating means estimates the road gradient based on road information received from a navigation system.

7. The atmospheric pressure sensing apparatus according to claim 1, wherein the measured atmospheric pressure value limiting means limits the measured atmospheric pressure value based on a change in a temperature inside the case.

8. The atmospheric pressure sensing apparatus according to claim 1, wherein the case is arranged in an engine room of the vehicle.

* * * * *